United States Patent [19]

DiNatale

[11] 4,087,180

[45] May 2, 1978

[54] PHOTOGRAPHIC PRINTING METHOD

[76] Inventor: Robert F. DiNatale, Old Mill Rd., Sutton, Mass. 01527

[21] Appl. No.: 763,326

[22] Filed: Jan. 28, 1977

[51] Int. Cl.² .............................................. G03B 27/32
[52] U.S. Cl. ......................................... 355/77; 355/32
[58] Field of Search ..................... 355/67, 77, 32, 35, 355/36, 38, 68, 71

[56] References Cited

U.S. PATENT DOCUMENTS

| | | | |
|---|---|---|---|
| 3,529,522 | 9/1970 | Dunn | 355/68X |
| 3,601,485 | 8/1971 | Barbieri | 355/77 X |
| 3,672,766 | 6/1972 | Levy | 355/32 |
| 3,709,601 | 1/1973 | Zahn et al. | 355/35 X |
| 3,775,006 | 11/1973 | Hartman et al. | 355/32 X |
| 3,797,933 | 3/1974 | Sable | 355/77 X |
| 3,967,897 | 7/1976 | Rogers | 355/32 |

OTHER PUBLICATIONS

A Guide to Simplified Color Printing 1974 Beseler Photo Marketing Co., pp. 14 & 15 of pp. 1 to 32.

Primary Examiner—Donald A. Griffin
Attorney, Agent, or Firm—Joseph S. Iandiorio

[57] ABSTRACT

A method of photographic printing comprising making at least one exposure of a simulation of a properly exposed neutral gray card for a film to be printed, having particular D/log E characteristics, and a film-mask-colored element for film having a colored mask, for at least one predetermined period of time on at least one sheet of photographic paper having certain D/log E characteristics; processing each sheet of paper; and comparing each such exposure of a simulation of a properly exposed gray card using color filters to determine the proper exposure time and color filtration to be used to print all films having D/log E characteristics generally similar to the particular D/log E characteristics on paper having D/log E characteristics generally similar to the certain D/log E characteristics.

34 Claims, 14 Drawing Figures

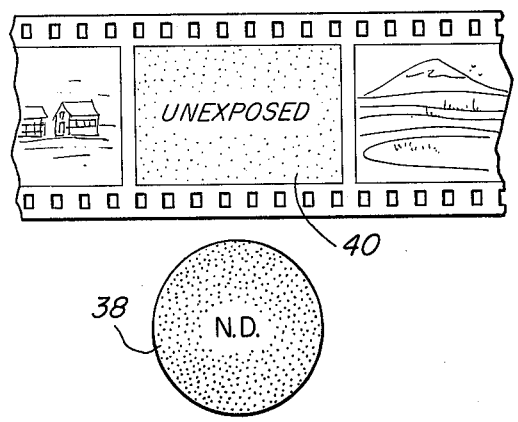
FIG. 6.
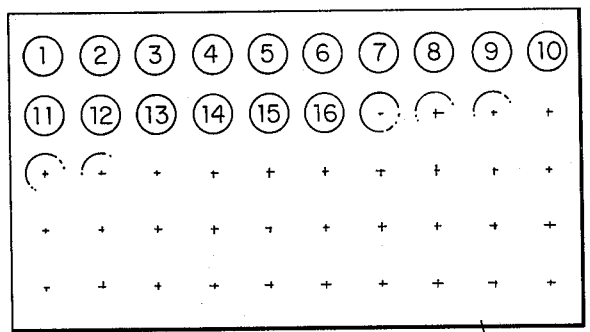
FIG. 7.
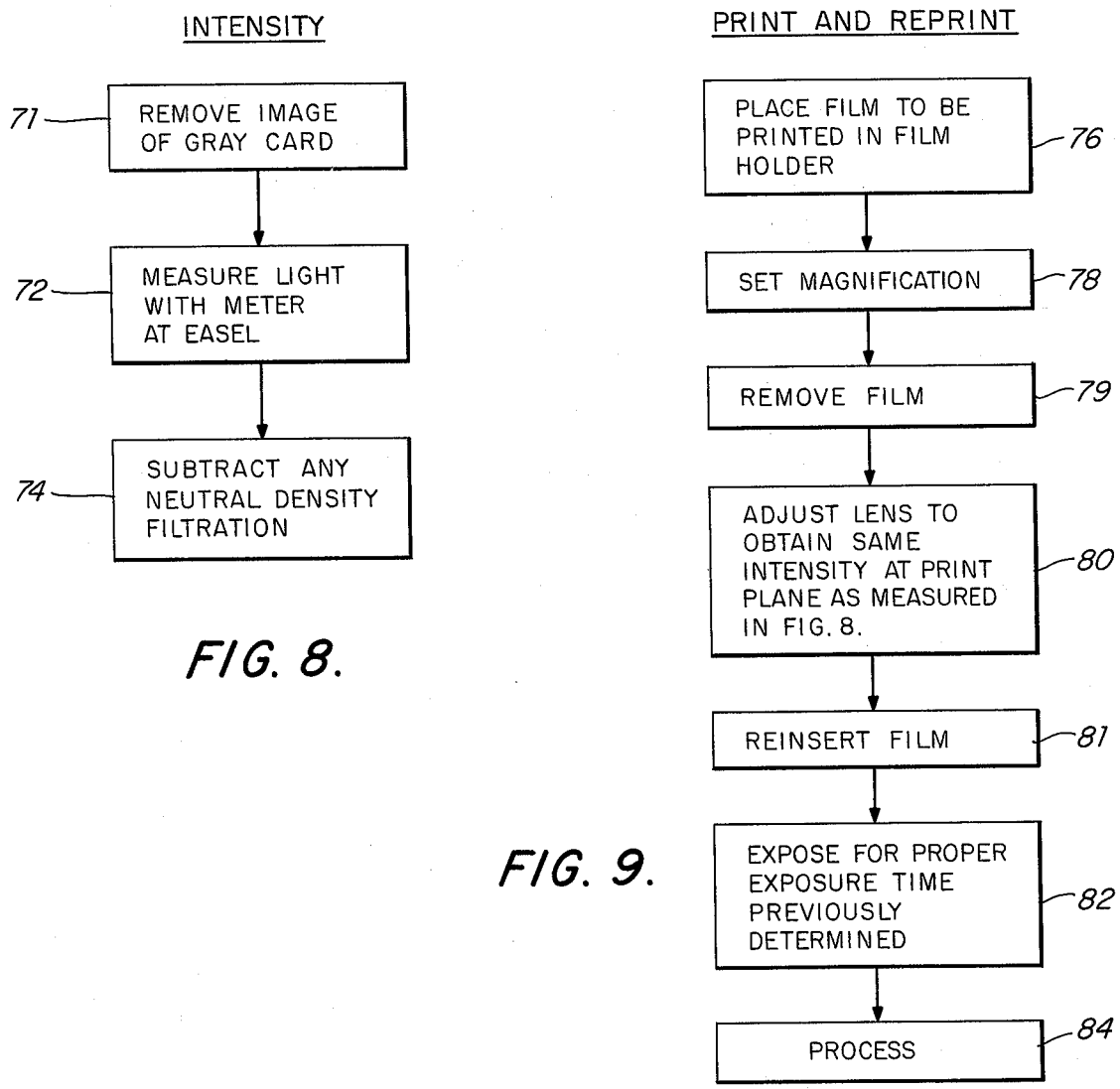
FIG. 8.
FIG. 9.

PRODUCE REFERENCE GRAY SCALE

PRINT WITH REFERENCE GRAY SCALE

PHOTOGRAPHIC PRINTING METHOD

FIELD OF INVENTION

This invention relates to a method of photographic printing and more particularly to a method for determining one proper exposure time and one color filter combination which provides faithful color reproduction of all frames on all films of a particular class, when printed on any photographic paper having a specific color response, and to such a method for determining the light intensity required to maintain that exposure time and color balance regardless of magnification variations.

BACKGROUND OF INVENTION

Traditionally, one or more test prints must be made and evaluated to determine the proper exposure time and color filtration required to properly expose and color balance a print of an image on particular positive or negative film. More recently, with the introduction of color filter calculator devices such as, for example, the Subtractive Calculator Kit by Beseler and the Mitchell Duocube by Unicolor, the determination of exposure time and color filtration has allegedly been simplified. Typically with such devices one must make a test print through the calculator using light transmitted through the frame to be printed and a diffuser. After processing the print, the calculator pattern of a multitude of dots or areas is compared against a standard gray card to determine the proper color filtration. The exposure time may be determined by the dot or area which fixes the color filtration or by an area or dot in another pattern of area produced through the calculator. If the calculator print produces no acceptable time or filtration, a second such print with initial filter and/or time parameters may be required. Nevertheless, even if the first calculator test print is sufficient to give time and filtration, those parameters suffice only for that frame of that film on that paper. If another frame is to be printed, the whole process is repeated. In some cases, however, it is suggested that if a properly exposed frame with good color balance is included in the roll of film with which you are printing, the color filtration and exposure time obtained for that frame may be used as at least a starting point for the other frames. Thus even with these color calculator devices, there is still required a great deal of experimentation from frame to frame regarding color balance and exposure time.

Producers of film and paper usually suggest a color filtration but this can not be relied on as an optimum because of the variations in each individual's enlarger light, lens, age of the lamp, voltage levels, film, and paper age at processing and other variables.

SUMMARY OF INVENTION

It is an object of this invention to provide an improved and extremely simple method of photographic printing.

It is a further object of this invention to provide a method of determining one proper exposure time and one proper color filter combination for all frames of a film, and all films of a particular class printed on any photographic paper having a specific color response.

It is a further object of this invention to provide such a method for determining the light intensity required to maintain that exposure time and color filter combination regardless of variations in magnification.

The invention results from the realization that the exposure time and color filter required to faithfully reproduce a simulation of a gray card for a particular class of film on a photographic paper having a specific color response is the one proper exposure time and one color filter which faithfully reproduces the color in all frames of all films of that class when printed on any paper having that specific color response.

This invention features a method of photographic printing including a method of obtaining exposure time and color filtration for photographic printing. The method includes making at least one exposure of a simulation of a properly exposed neutral gray card for film to be printed, which film is of a particular class, i.e. has particular D/log E characteristics, in combination with a film-mask-colored element for film having a colored mask, for at least one predetermined period of time on at least one sheet of photographic paper having a specific color response, i.e. having certain D/log E characteristics. Each sheet of paper so exposed is then processed. Each exposure of the simulation of a properly exposed gray card on each sheet of paper is then compared to a gray card and, using color filters, the proper exposure time and color filtration is determined. This exposure time and color filtration which faithfully reproduces a gray card, is then used to print all frames of all films of that class, i.e. having D/log E characteristics generally similar to the particular D/log E characteristics on paper having the same specific color response, i.e. D/log E characteristics generally similar to the certain D/log E characteristics.

The method further embraces introducing any necessary additional color filtration in the exposing light and then measuring the intensity of the exposing light at the printing plane. The intensity of the exposing light so measured is the intensity which always must be present at the printing plane where the paper is located to produce the proper exposure at the particular exposure time and with the particular color filtration prescribed, regardless of variations in the magnification.

Subsequently, any print of any image on a film may be made by exposing an additional sheet of paper, having D/log E characteristics generally similar to the certain D/log E characteristics, to an image on a film, having D/log E characteristics generally similar to the particular D/log E characteristics, with light of the measured intensity through the color filtration required to faithfully reproduce the simulation of a properly exposed gray card for the proper exposure time and processing the additional sheet of paper to obtain a print of the image on the film.

Allowances for less than optimally exposed frames may be made by exposing an additional sheet of paper, having D/log E characteristics generally similar to the certain D/log E characteristics, to an image of a gray scale of a film, having D/log E characteristics generally similar to the certain D/log E characteristics, to an image of a gray scale of a film, having D/log E characteristics generally similar to the particular D/log E characteristics, with light having an intensity at the paper at a selected density step of the gray scale adjusted to the measured intensity for the proper exposure time through the color filtration required to faithfully reproduce the simulation of a properly exposed gray card, then processing the additional sheet of paper to obtain an image of the gray scale, and finally measuring the intensity of the light at each of the density steps of the gray scale on the print.

The accommodation for less than optimally exposed frames is then carried out by selecting at least one portion of an image on a film, having D/log E characteristics generally similar to the particular D/log E characteristics, and comparing that selected portion to the density steps on the print of the image of a gray scale. The density step desired for that portion of the image is then selected and the light intensity at the print plane for that portion of the image is adjusted to equal the light intensity measured for the selected density step. A further sheet of paper having D/log E characteristics generally similar to the certain D/log E characteristics is exposed for the proper time through the proper color filtration necessary to reproduce a simulation of a properly exposed gray card, and then the paper is processed to obtain a print of the image of the film.

When the film to be printed is a positive film, the simulation of a properly exposed gray card may be an image of a gray card photographed onto the positive film; or it may be from a 0.7 to 1.2 neutral density filter. Since all positive films must be color balanced to faithfully reproduce naturally occurring scenes, they all are considered as having generally similar D/log E characteristics; that is, the D/log E characteristic for each of the color dyes in the film emulsion are approximately coincidental for the significant portion of their extent. Thus, exposure time and color filter combination determined as proper for a particular positive film to obtain a faithful reproduction of a gray card on photographic paper having a specific color response, i.e. certain D/log E characteristics, will be valid for all other positive films. However, if a photographic paper having a different emulsion, i.e. different D/log E characteristics, is used, adjustment must be made to accommodate for the differences between the two different papers or a new exposure of a simulation of a properly exposed gray card must be made on the new paper to determine a new color pack and exposure time.

If the simulation of a properly exposed gray card is a neutral density filter, then the particular color personality for which the film is known will be maintained: Ektachrome will maintain its sharp blues and slight bluish cast; Kodachrome its slight reddish cast; Fujichrome its slight greenish cast. However, if the simulation of a properly exposed gray card is provided by an image of the gray card on a particular film, the color personality of that particular film will be compensated for and eliminated. For example, an image of a gray card on Ektachrome will eliminate the blue cast to the prints, an image of a gray card on Kodachrome will eliminate the red cast to the prints.

If the film to be printed is a negative film, the simulation of a properly exposed gray card may be an image of a gray card on the negative film or a neutral density filter in combination with an element having the same color as the mask of the negative film. An addition of this element is not necessary when an image of a gray card is used, because the negative intrinsically contains its own mask coloration, which will then be compensated for in determining the color filter. In positive film, no such color mask element is needed, since there is no color mask in positive film: the film is essentially clear. Negative films are not typically balanced, as are positive films, to faithfully reproduce naturally occurring colors; this is typically left to colorbalancing techniques used in conjunction with the printing paper at the time of printing. Thus D/log E characteristics are not the same for all negative films: they are only alike for all negative films of the same manufacturer having the same emulsion. Thus the exposure time and color pack determined for a particular negative film and a certain color paper may be used for all the frames on that negative film so long as it is printed on that color paper, but may only be used for other negative films insofar as they are produced with the same emulsion.

The method accommodates black and white film as well as color film, and may be effectively used to make contact prints by simply using the techniques heretofore recited with the frame or frames in close proximity or contacting the photographic printing paper.

DISCLOSURE OF PREFERRED EMBODIMENT

Other objects, features and advantages will occur from the following description of a preferred embodiment and the accompanying drawings, in which:

FIG. 6 depicts a neutral density filter and a portion of a negative film containing an unexposed, developed frame;

FIG. 7 depicts a typical commercially available color filter calculator device for darkroom use;

FIG. 8 is a flow chart showing steps in determining the intensity of light required to produce a print using the color filtration and exposure time determined by performing the sequence of steps shown in FIG. 2;

FIG. 9 is a flow chart showing the steps according to this invention for printing an image using the color filtration and exposure time determined by the sequence of steps in FIG. 2 and the light intensity determined from the steps in FIG. 8;

Figure 1:
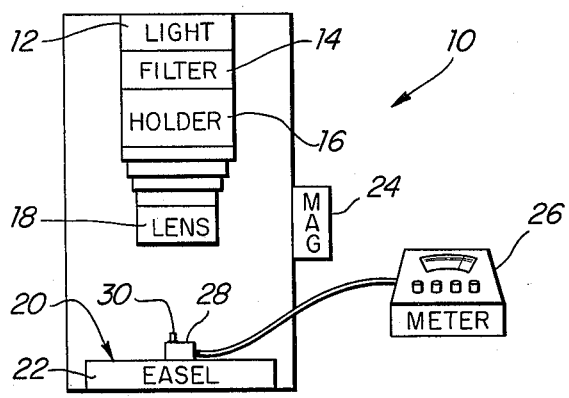
FIG. 1 is a diagrammatic view of a conventional enlarger and meter which may be used to perform the method of this invention.

The invention may be accomplished with a method of photographic printing for use with a light source, a print plane, a film holder positioned between the print plane and light source, and stop setting means and image producing means between the holder and the print plane. First, there is inserted between the light source and print plane the simulation of a properly exposed neutral gray card for a film to be printed which has particular D/log E characteristics and a film-maskcolored element for film having a colored mask. There is then made at least one exposure of the simulation of a properly exposed neutral gray card for at least one predetermined period of time on at least one sheet of photographic paper having certain D/log E characteristics. Finally, each exposure of the simulation of the properly exposed gray card is compared to a gray card, using color filters where necessary, to determine the proper exposure time and color filtration required to faithfully reproduce the simulation of a properly exposed gray card on photographic paper having the certain D/log E characteristics. To determine the intensity of the light required to make the proper exposure, a simulation of a properly exposed gray card, and the film-mask-colored element, for film having a colored mask, is removed, any necessary additional color filtration is added, and the intensity of the light incident at the print plane is measured and recorded. Assuming properly exposed images on film, prints of such images on any film having D/log E characteristics generally similar to the particular D/log E characteristics for which the exposure time and color pack were determined may be made on any paper having D/log E characteristics generally similar to the certain D/log E characteristics of the paper for which the exposure time and color pack were determined, by inserting in the film holder such film containing an image to be printed and then setting the distance between the film and the print plane to obtain the desired magnification. After removing the film from the enlarger film holder, the stop setting means is adjusted to obtain the same light intensity at the print plane as previously measured. The film pack is then returned to the enlarger film holder and an additional sheet of photographic paper having D/log E characteristics similar to the certain D/log E characteristics of the original paper is exposed at he print plane using the same color filtration, and the same exposure time. This additional sheet of paper is processed to obtain a print of the image on the film.

For processing film frames whose exposure may have been less than optimum, a method employing a reference chart may be advantageous. To accomplish this, a film having D/log E characteristics generally similar to the particular D/log E characteristics of the original film, is inserted between the light source and image-producing means. The distance between the film bearing the image of the gray scale and the print plane is set to obtain a desired magnification at the print plane. The reference chart is removed. Stop setting means are adjusted to obtain the same light intensity at the print plane as previously measured light intensity. An additional sheet of photographic paper having D/log E characteristics generally similar to the certain D/log E characteristics of the original paper is exposed at the print plane for the proper exposure time and using the same color filtration. The sheet of paper is then processed and the intensity of the light incident at the printing plane at each of the density steps of the gray scale is measured and may be recorded directly on the print.

Now prints may be made of the image-bearing film frames by inserting between the light source and image producing means an image-bearing frame of film having D/log E characteristics generally similar to the D/log E characteristics of the original film, and then setting the distance between the film bearing an image to be printed and the print plane to obtain the desired magnification of the print plane. Then, at least one portion of the image to be printed at the print plane is selected and is compared to a selected density step on the print of the image of a gray scale. The density step desired for that portion of the image is selected and then the stop setting means is adjusted to obtain the same light intensity at that portion of the image as the light intensity previously measured for that selected density step. Then an additional sheet of photographic paper having D/log E characteristics generally similar to the certain D/log E characteristics of the original paper is exposed at the print plane for the proper exposure time with the same color filter combination. The sheet of paper is then processed to obtain a print of the image on the film.

Contact prints may be made by using the same color filter pack and exposure time as previously discussed and setting the magnification and stop as explained supra, and then exposing an additional sheet of photographic paper having D/log E characteristics generally similar to the certain D/log E characteristics of the original paper with the film at the print plane on top of the paper.

The simulation of a properly exposed neutral gray card for either positive or negative film may be either a frame of that film containing an image on a gray card properly exposed or may be a neutral density filter in conjunction with any mask-colored-element necessary for film which has a colored mask. Typically, positive films are essentially clear and have no color mask, while negative films typically do have a color mask and will require some mask-colored-element to compensate.

In preferred embodiments, a starting color pack may be used by inserting in the color head of the enlarger the initial color filtration recommended by the manufacturer for that particular emulsion batch of paper. Further, the initial exposures of the simulation of a properly exposed neutral gray card may be made through a color filter calculator device which, through its capability for making a number of dots or areas, each of different filtration and/or exposure characteristics, substantially lessens the number of test prints that have to be made and in fact, if properly done, only one test print may be needed.

There is shown in FIG. 1 an enlarger 10 having a light source 12, color filter chamber 14, film holder 16, and lens 18, which incorporates both image-producing means and stop means. Print plane 20 for containing photographic paper to be printed is provided by easel 22 and a magnification control 24 sets the size of the image at easel 22. Any convenient meter 26 may be used; preferably it has a probe 28 with a pinpoint feature 30 that enables it to read and to determine light intensity in a very small area.

Figure 2:
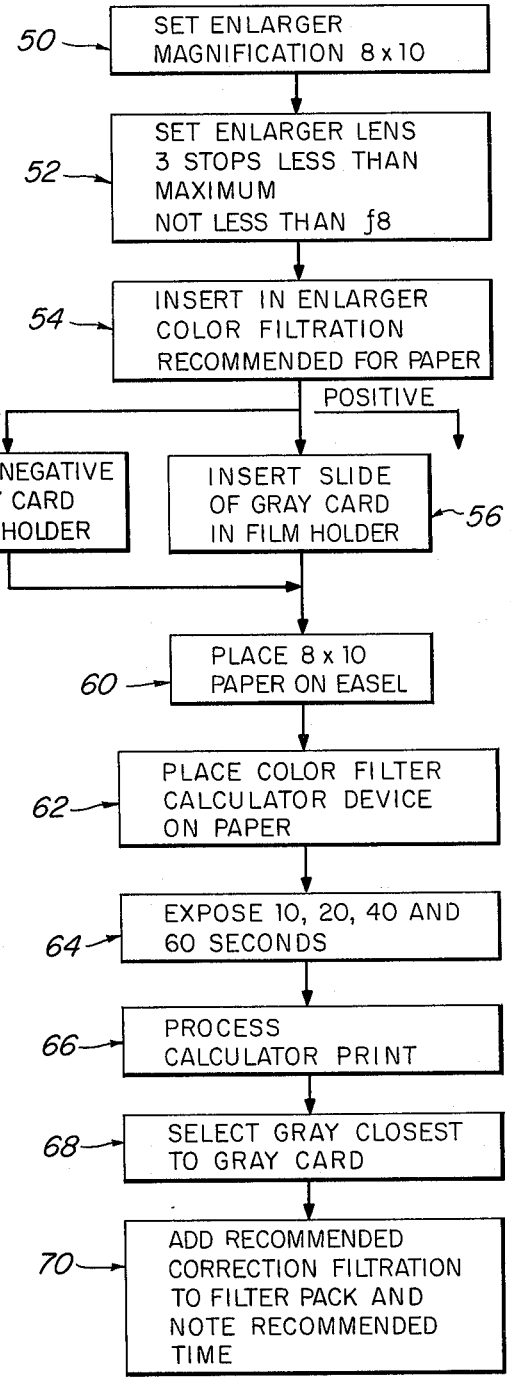
FIG. 2 is a flow chart showing the steps for obtaining the proper color filtration and exposure time according to this invention.

In accordance with one technique for carrying out the method of this invention, the enlarger FIG. 1, first has its magnification set, step 50, FIG. 2, to some medium range magnification, typically 8 × 10 inches. Next, enlarger lens 18 is set, Step 52, to three stops less than the maximum provided for in the lens but at any rate typically not less than $f/8$. Following this, in Step 54, the color filtration recommended for the photographic paper to be used is inserted in the enlarger.

Figure 3:
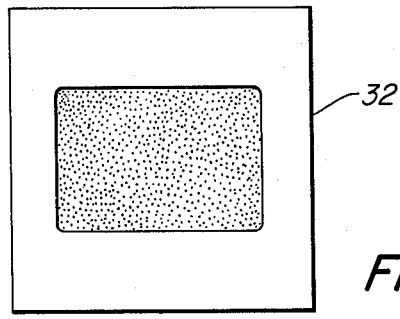
FIG. 3 depicts an image on positive film of a neutral density gray card mounted in a slide.
Figure 4:
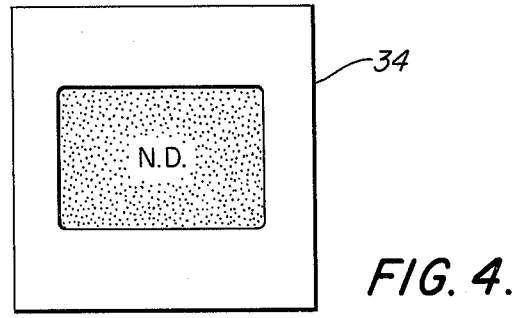
FIG. 4 depicts a neutral density filter mounted in a slide.
Figure 5:
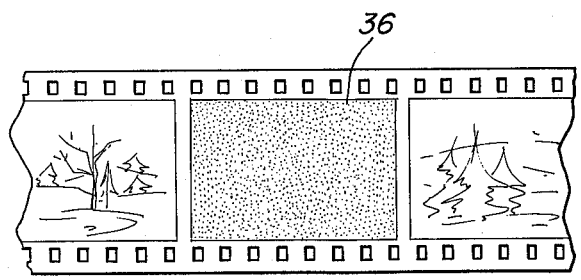
FIG. 5 depicts a portion of a negative film showing a frame containing an image of a neutral density gray card.

At this point, if the film to be printed is positive film, either a 0.7–1.2 neutral density filter 31, FIG. 4, or positive film frame of a gray card 32, FIG. 3, is put in the film holder 16, Step 56. If the film is a negative film, then either the negative of the gray card 36, FIG. 5, or a 0.7–1.2 neutral density filter 38, FIG. 6, with an unexposed frame of film 40 or equivalent mask-colored element is inserted in the film holder, Step 58. Following this, an 8 × 10 sheet of photographic paper is placed on easel 22, Step 60, and a color filter calculator device 42, FIG. 7, is placed on top of the paper, Step 62. When a color calulator is used, such as a Unicolor Mitchell Duocube, which has a neutral density filter built into it, the gray card frame or neutral density filter normally loaded in the frame may be eliminated. That density must be known and allowed for in determining a meter reading.

One or more exposures may now be made, Step 64, for different periods of time through this color filter calculator device: for example, to make four exposures on one piece of 8 × 10 paper in 10, 20, 40 and 60 seconds.

Subsequently, the print is processed, Step 66, and if a calculator device has been used, the dot or area closest to a gray card is selected, Step 68, to determine the proper exposure time and color filtration. If no calculator device is used, then each exposure made is compared to a gray card using color filters to obtain the proper exposure time and filtration.

The recommended color filtration is now added to whatever filter pack may already be in the enlarger and the recommended exposure time is noted, Step 70. For all future prints made on the same batch of paper or paper having the same emulsion number or identification code, the same filtration pack and exposure time is used for all film frames having the same D/log E characteristics; that is, if Step 56 was performed using a positive film, then this color pack and exposure time is proper for all frames of all positive film.

Alternatively, if Step 58 was performed, this color pack and this exposure time is proper for all paper identified as having this emulsion code, i.e. having the similar D/log E characteristics, when used with any negative film having the same D/log E characteristics as originally used, i.e. having the same emulsion.

In referring to processing prints throughout this application, all types of processing are included; that is, prints exposed by means of this method are processed with traditional wet-processing techniques using three, four, five, and even more processing steps. More recently developed wet processing techniques, such as Unicolor and Beseler, using only one or two wet processing steps, are also used very effectively, and the method works extremely well with Polaroid film, which requires no conventional wet processing steps: the processing in the case of Polaroid film merely involves pulling the exposed film to actuate the 60-second printing process without the use of any wet process.

The intensity required to obtain proper exposure with the now-determined exposure time and color filter pack may be determined by removing the image of the gray card, Step 71, FIG. 8, and measuring the light at the print plane 20 on the easel 22 with a meter 26, Step 72, after the recommended color filtration has been added to the filter pack. Once determined this intensity, however measured or calibrated as indicated by meter 26, is the intensity that must be present on the print plane to obtain the proper exposure, regardless of any variations in magnification. This will be better understood with reference to FIG. 9, infra. At this point any natural density filtration in the color pack may be subtracted, Step 74.

The printing of any frame on any similar film as previously defined, may be performed on any similar paper as herein defined by placing the film to be printed in the film holder of the enlarger Step 78, removing the film, Step 79, and adjusting the lens of the enlarger, Step 80, to obtain the same intensity on the print plane, 20, on easel 22, as measured above in Step 72. The lens 18, holder 16, filter 14 and light source 12 of enlarger 10, FIG. 1, may be moved to any position vertically above print plane 20 to obtain whatever magnification is desired. However, the desired results will obtain so long as the intensity of print plane 20, as indicated in Step 80, is maintained at the same intensity as measured in Step 72.

Subsequently, the film is replaced, Step 81, a sheet of photographic paper having similar characteristics is exposed to the print plane, Step 82, and then processed, Step 84, to obtain a print.

Figure 10:
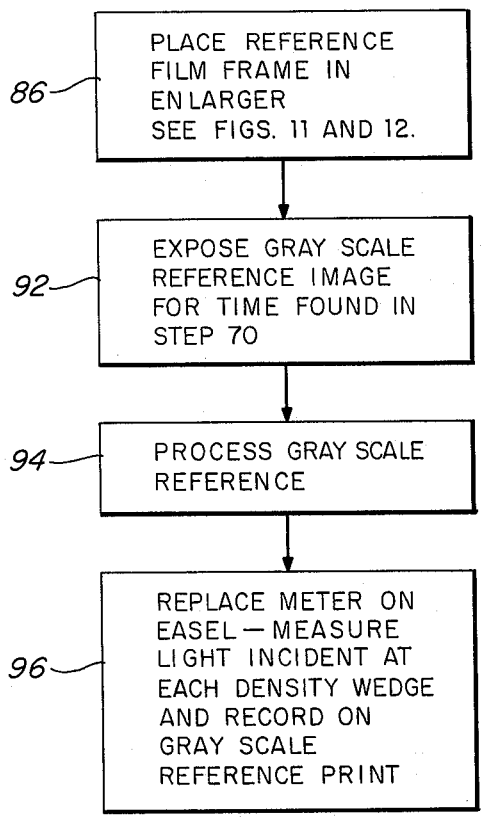
FIG. 10 shows the steps according to this invention for producing a reference gray scale for use in determining light intensity to be used for less than optimumly exposed images on film.
Figure 11:
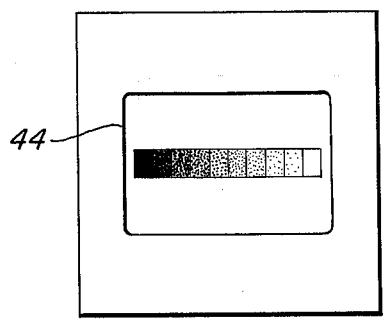
FIG. 11 depicts the image of a gray scale on positive film mounted on a slide.
Figure 12:
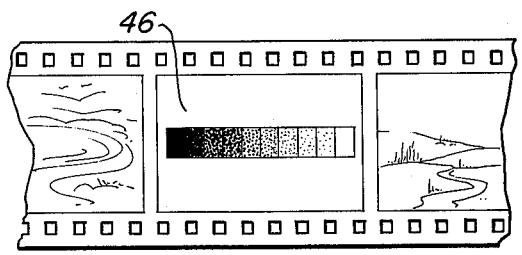
FIG. 12 depicts a portion of a negative film containing a frame bearing the image of a gray scale.

In cases where the film frame images are not expected to be optimumly exposed, exposure intensity may be varied in conjunction with a reference gray scale which may be produced as follows. The recommended color filtration ascertained in Step 70 is installed in the enlarger: a film frame containing an image of a gray scale is installed, Step 86, FIG. 10, in the film holder. If the film is positive then the image of the gray scale is on a positive frame or slide 44, FIG. 11. If the film is negative, the image is contained on a negative film frame 46, FIG. 12. The gray scale reference image is now exposed, Step 92, for the time found in step 70, and is processed, Step 94, to obtain a print 48, FIG. 13, of the gray scale. Readings are now made at print plane 20 of the intensity of each of the density steps projected on print plane 20 and are advantageously recorded, 47, on print 48.

Figure 14:
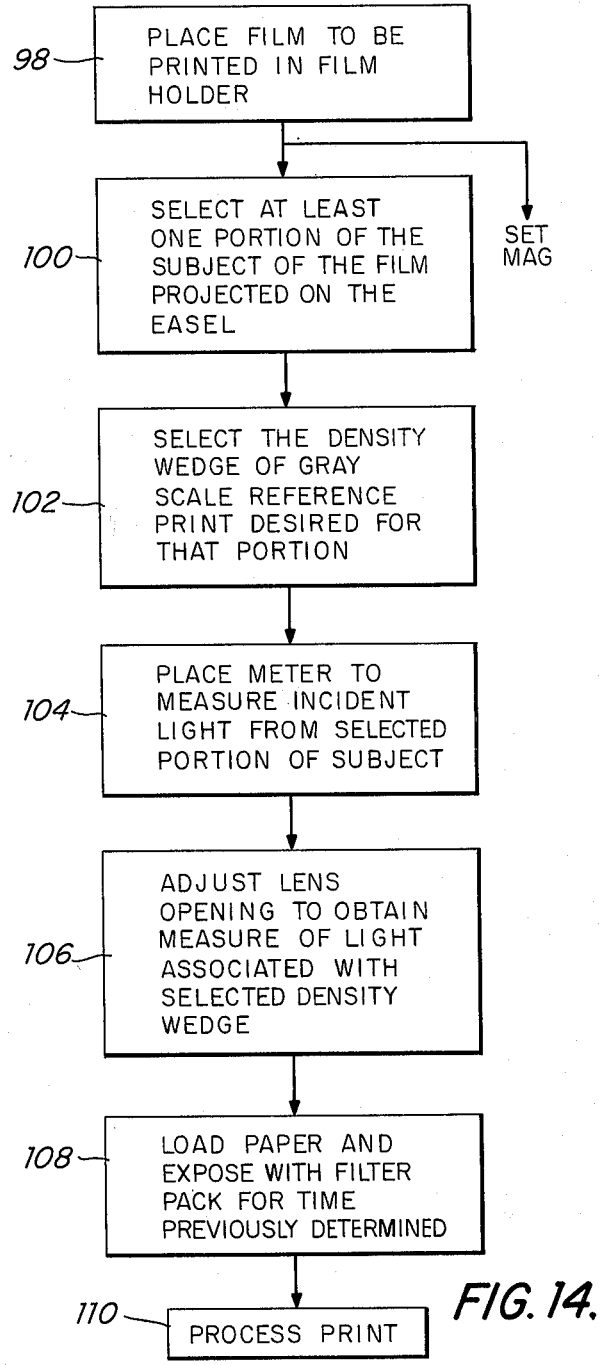
FIG. 14 is a flow chart showing the steps according to this invention for printing less than optimally exposed film frames using the gray scale reference chart developed pursuant to the steps depicted in FIG. 10.

The resulting gray scale reference chart may be advantageously used in printing less than optimumly exposed images by placing, Step 98, FIG. 14, in the film holder the film frame with the image to be printed.

Figure 13:
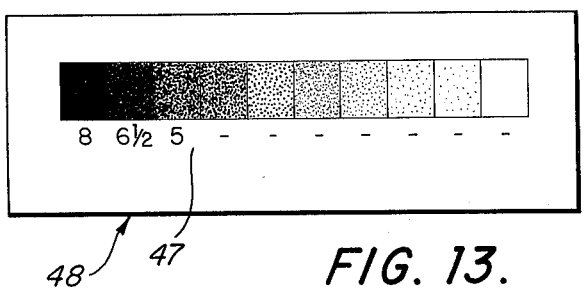
FIG. 13 depicts a print of a gray scale made from the image of the gray scale reference chart depicted in either FIG. 11 or FIG. 12.

Following the usual adjustments of magnification and intensity, at least one portion of the subject of the film projected on the easel is selected, Step 100. Next, the density step of the gray scale reference print 48, FIG. 13, is selected, Step 102, which is desired for that portion of the image selected in Step 100. Following this, meter 26 is used to measure the incident light at the print plane from a selected portion of the subject, Step 104. Subsequently the lens is adjusted, Step 106, to obtain the same light intensity as previously recorded on print 48 for that density step. Photographic paper of the same color response is placed on easel 22 and exposed using the same filter pack and time exposure as previously determined, Step 108, and the print is processed, Step 110.

Other embodiments will occur to those skilled in the art and are within the following claims.

What is claimed is:

1. A method of photographic printing comprising:
making at least one exposure of a simulation of a properly exposed neutral gray card for a film to be printed having particular D/log E characteristics, and a film-mask-colored element for film having a colored mask, for at least one predetermined period of time on at least one sheet of photographic paper having certain D/log E characteristics;
processing each sheet of paper; and
comparing each such exposure of said simulation of a properly exposed gray card to a gray card reference to determine the proper exposure time and the color filtration to be used to print all films having D/log E characteristics generally similar to said particular D/log E characteristics on paper having D/log E characteristics generally similar to said certain D/log E characteristics.

2. The method of claim 1 further including adding necessary color filtration in the exposing light; and measuring the intensity of the exposing light at the printing plane.

3. The method of claim 2 further including exposing an additional sheet of paper, having D/log E characteristics generally similar to said certain D/log characteristics, to an image on a film, having D/log E characteristics generally similar to said particular D/log E characteristics, with light at said measured intensity through the color filtration required to faithfully reproduce the simulation of a properly exposed gray card for said proper exposure time, and processing said additional sheet of paper to obtain a print of the image on the film.

4. The method of claim 2 further including
exposing an additional sheet of paper, having D/log E characteristics generally similar to said certain D/log E characteristics, to an image of a gray scale on a film, having D/log E characteristics generally similar to said particular D/log E characteristics, with light having an intensity at the paper adjusted to said measured intensity for said proper exposure time through the color filtration required to faithfully reproduce the simulation of a properly exposed gray card;
processing said additional sheet of paper to obtain a print of the image of the gray scale; and
measuring the intensity of light at each of the density steps of the gray scale at the print plane.

5. The method of claim 4 further including
selecting at least one portion of an image on a film, having D/log E characteristics generally similar to said particular D/log E characteristics;
comparing that selected portion to the density steps on the print of the image of a gray scale;
selecting the density step desired for that portion of the image;
adjusting the light intensity at the print plane for that portion of the image to light intensity for the selected density step;
exposing a further sheet of paper, having D/log E characteristics generally similar to said certain D/log E characteristics, for the proper time through said color filtration required to faithfully reproduce the simulation of a properly exposed gray card; and
processing said further sheet of paper to obtain a print of the image on the film.

6. The method of claim 2 further including exposing an additional sheet of paper, having D/log E characteristics generally similar to said certain D/log E characteristics, to an image on a film, which is in close proximity to said additional sheet of paper, and which has D/log E characteristics generally similar to said particular D/log E characteristics, with light at said measured intensity through the color filtration required to faithfully reproduce the simulation of a properly exposed gray card for said proper exposure time, and processing said additional sheet of paper to obtain a contact print of the image on the film.

7. The method of claim 1 in which the film to be printed is a positive film and the simulation of a properly exposed gray card is an image of a gray card on a positive film having D/log E characteristics generally similar to said particular D/log E characteristics.

8. The method of claim 1 in which the film to be printed is a positive film and the simulation of a properly exposed gray card is a 0.7-1.2 neutral density filter.

9. The method of claim 1 in which the film to be printed is a negative film and the simulation of a properly exposed gray card is an image of a gray card on negative film having D/log E characteristics generally similar to said particular D/log E characteristics.

10. The method of claim 1 in which the film to be printed is a negative film and the simulation of a properly exposed gray card is a neutral density filter.

11. The method of claim 1 in which the film to be printed is a color film.

12. A method of photographic printing for use with a light source, a print plane, a film holder between the print plane and light source; stop setting means; and image producing means between the holder and the print plane comprising:
inserting between the light source and print plane a simulation of a properly exposed neutral gray card for a film to be printed having particular D/log E characteristics and a film-mask-colored element for film having a colored mask;
making at least one exposure of said simulation of a properly exposed neutral gray card for at least one predetermined period of time on at least one sheet of photographic paper having certain D/log E characteristics; and
comparing each said exposure of said simulation of a properly exposed gray card to a gray reference to determine the proper exposure time the color filtration required to faithfully reproduce the simulation of a properly exposed gray card on photographic paper having said certain D/log E characteristics.

13. The method of claim 12, further including
removing the simulation of a properly exposed gray card and film-mask-colored element for film having a colored mask;
adding any necessary color filtration;
measuring the intensity of the light incident at the print plane.

14. The method of claim 13 further including
setting the distance between the image-producing means and the print plane to obtain a desired magnification at the print plane;
adjusting the stop setting means to obtain the same light intensity at the print plane as previously measured;
inserting in the film holder film having D/log E characteristics generally similar to said particular D/log E characteristics, bearing an image to be printed;
exposing an additional sheet of photographic paper, having D/log E characteristics generally similar to said certain D/log E characteristics, at the print plane for said proper exposure time; and
processing said additional sheet of paper to obtain a print of the image on the film having an image to be printed.

15. The method of claim 13 further including
setting the distance between the image-producing means and print plane to obtain a desired area of illumination at the print plane;
adjusting the stop setting means to obtain the same light intensity at the print plane as previously measured;
inserting between the light source and print plane, at the print plane, film having D/log E characteristics generally similar to said particular D/log E characteristics, bearing an image to be printed;

exposing an additional sheet of photographic paper, having D/log E characteristics generally similar to said certain D/log E characteristics, at the print plane for said proper exposure time; and processing said additional sheet of paper to obtain a contact print of the image on the film bearing an image to be printed.

16. The method of claim 12 further including adding any necessary color filtration; and measuring the intensity of the light incident at the print plane.

17. The method of claim 16 further including removing the simulation of a properly exposed gray card and film-mask-colored element for film having a colored mask;

inserting between the light source and image-producing means a film, having D/log E characteristics generally similar to said particular D/log E characteristics, bearing an image of a gray scale;

setting the distance between the film bearing the image of a gray scale and the image producing means and the print plane to obtain a desired magnification at the print plane;

adjusting the stop setting means to obtain the same light intensity at the print plane as previously measured;

exposing an additional sheet of photographic paper, having D/log E characteristics, at the print plane for said proper exposure time;

processing said additional sheet of paper to obtain a print of the image of a gray scale; and measuring the intensity of light incident at the print-plane at each of the density steps of the gray scale.

18. The method of claim 17 further including removing the film bearing the image of a gray scale;

inserting between the light source and image producing means a film having D/log E characteristics generally similar to said particular D/log E characteristics, bearing an image to be printed;

setting the distance between the film bearing an image to be printed and the print plane to obtain a desired magnification at the print plane;

selecting at least one portion of the image to be printed at the print plane;

selecting the density step on the print of the image of the gray scale desired for that portion of the image;

adjusting the stop setting means to obtain the same light intensity at that portion of the image as the light intensity measured for the selected density step;

exposing a further sheet of photographic paper, having D/log E characteristics generally similar to said certain D/log E characteristics, at the print plane for said proper exposure time; and processing said further sheet of paper to obtain a print of the image on the film.

19. The method of claim 12 in which the film to be printed is a positive film and the simulation of a properly exposed gray card is an image of a gray card on positive film having D/log E characteristics generally similar to said particular D/log E characteristics.

20. The method of claim 12 in which the film to be printed is a positive film and the simulation of a properly exposed gray card is a 0.7–1.2 neutral density filter.

21. The method of claim 12 in which the film to be printed is a negative film and the simulation of a properly exposed gray card is an image of a gray card on negative film having D/log E characteristics generally similar to said particular D/log E characteristics.

22. The method of claim 12 in which the film to be printed is a negative film and the simulation of a properly exposed gray card is a neutral density filter.

23. The method of claim 12 in which the film to be printed is a color film.

24. A method of obtaining exposure time and color filtration for photographic printing on color paper, having certain D/log E characteristics, for use with a light source, a print plane, a film holder between the print plane and light source and stop setting means and image producing means between the holder and print plane, from an image on positive film, having particular D/log E characteristics, comprising:

inserting in the film holder an image of a gray card on positive film having D/log E characteristics generally similar to said particular D/log E characteristics;

making at least one exposure of said image of a gray card for at least one predetermined period of time on at least one sheet of photographic paper, having D/log E characteristics similar to said certain D/log E characteristics, at the print plane; and comparing each said exposure of said gray card to a gray reference to determine the proper exposure time and the color filtration to faithfully reproduce the image of a gray card and to be used to print images from all frames of all films having D/log E characteristics generally similar to said particular D/log E characteristics on paper having D/log E characteristics generally similar to said certain D/log E characteristics.

25. A method of obtaining exposure time and color filtration for photographic printing on color paper, having certain D/log E characteristics, for use with a light source, a print plane, a film holder between the print plane and light source and stop setting means and image producing means between the holder and print plane, from an image on positive film, having particular D/log E characteristics, comprising:

inserting in the film holder a 0.7–1.2 neutral density filter;

making at least one exposure through said 0.7–1.2 neutral density filter for at least one predetermined period of time on at least one sheet of photographic paper, having D/log E characteristics generally similar to said certain D/log E characteristics, at the print plane; and comparing each said exposure of said density filter to a gray reference to determine the proper exposure time and the color filtration required to faithfully reproduce a gray card and to be used to print images from all frames of all films having D/log E characteristics generally similar to said particular D/log E characteristics on paper having D/log E characteristics generally similar to said certain D/log E characteristics.

26. A method of obtaining exposure time and color filtration for photographic printing on color paper, having certain D/log E characteristics, for use with a light source, a print plane, a film holder between the print plane and light source, and stop setting means and image producing means between the holder and print plane, from an image on negative film, having particular D/log E characteristics, comprising:

inserting in the film holder an image of a gray card on negative film havin D/log E characteristics generally similar to said particular D/log E characteristics;

making at least one exposure of said image of a gray card for at least one predetermined period of time on at least one sheet of photographic paper, having D/log E characteristics generally similer to said certain D/log E characteristics, at the print plane; and comparing each said exposure of said gray card to a gray reference to determine the proper exposure time and the color filtration required to faithfully reproduce the image of a gray card to be used to print images from all frames of all films having D/log E characteristics generally similar to said particular D/log E characteristics on paper having D/log E characteristics generally similar to said certain D/log E characteristics.

27. A method of photographic printing for use with a light source, a print plane, a film holder between the print plane and light source, and stop setting means and image producing means between the holder and print plane comprising:

inserting between the light source and print plane a simulation of a properly exposed neutral gray card for a film to be printed having particular D/log E characteristics, and a film-mask-colored element for film having a colored mask;

making at least one exposure of said simulation of a properly exposed neutral gray card for at least one predetermine period of time on at least one sheet of photographic paper having said certain D/log E characteristics, at the print plane, through the initial color filtration recommended for that paper; and comparing each said exposure of said simulation of a properly exposed gray reference to determine the proper exposure time and the color filtration required to faithfully reproduce the simulation of a properly exposed gray card to be used to print images from all frames of all films having D/log E characteristics generally similar to said particular D/log E characteristics on paper having D/log E characteristics generally similar to said certain D/log E characteristics.

28. A method of photographic printing for use with a light source, a print plane, a film holder between the print plane and light source, and stop setting means and image producing means between the holder and print plane comprising:

inserting between the light source and print plane a simulation of a properly exposed neutral gray card for a film to be printed having particular D/log E characteristics, and a film-mask-colored element for film having a colored mask;

making at least one exposure through a color filter calculator device of said simulation of a properly exposed neutral gray card for at least one predetermined period of time on at least one sheet of photographic paper having said certain D/log E characteristics, at the print plane; and comparing each said exposure of said simulation of a properly exposed gray card to a gray reference to determine the proper exposure time and the color filtration required to faithfully reproduce the simulation of a properly exposed card to be used to print images from all frames of all films having D/log E characteristics generally similar to said particular D/log E characteristics on paper having D/log E characteristics generally similar to said certain D/log E characteristics.

29. A method of photographic printing for use with a light source, a print plane, a film holder between the print plane and light source, stop setting means, and image producing means between the holder and print plane comprising:

inserting between the light source and print plane a simulation of a properly exposed neutral gray card for a film to be printed having particular D/log E characteristics, and a film-mask-colored element for film having a colored mask;

making at least one exposure through a color filter calculator device of said simulation of a properly exposed neutral gray card for at least one predetermined period of time on at least one sheet of photographic paper having said certain D/log E characteristics, at the print plane, through the initial color filtration recommended for that paper; and comparing each said exposure of said simulation of a properly exposed gray card to a gray reference to determine the proper exposure time and the color filtration required to faithfully reproduce the simulation of a properly exposed gray card to be used to print images from all frames of all films having D/log E characteristics generally similar to said particular D/log E characteristics on paper having D/log E characteristics generally similar to said certain D/log E characteristics.

30. A method of photographic printing comprising:

making at least one exposure through a color filter calculator device of a simulation of a properly exposed neutral gray card for a film to be printed, having particular D/log E characteristics, and a film-mask-colored element for film having a colored mask, for at least one predetermined period of time on at least one sheet of photographic paper having certain D/log E characteristics;

processing each sheet of paper; and comparing each area of each such exposure of said simulation of a properly exposed gray card to a gray reference to determine the proper exposure time and the color filtration to be used to print all films having D/log E characteristics generally similar to said particular D/log E characteristics on paper having D/log E characteristics generally similar to said certain D/log E characteristics to be used to print images from all frames of all films having D/log E characteristics generally similar to said particular D/log E characteristics on paper having D/log E characteristics generally similar to said certain D/log E characteristics.

31. A method of photographic printing comprising:

making at least one exposure of a simulation of a properly exposed neutral gray card for a film to be printed having particular D/log E characteristics, and a film-mask-colored element for film having a colored mask, for at least one predetermined period of time on at least one sheet of photographic paper having certain D/log E characteristics;

processing each sheet of paper;

comparing each such exposure of said simulation of a properly exposed gray card to a gray reference to determine the exposure time; and measuring the intensity of the exposing light to obtain the proper time and intenstiy of exposure to be used to print all films having D/log E characteristics generally similar to said particular D/log E characteristics on paper having D/log E characteristics generally similar to said certain D/log E characteristics.

32. The method of claim 31 further including:
comparing each such exposure of said simulation of a properly exposed gray card to a gray reference to determine the color filtration to be used to print all films having D/log E characteristics generally similar to said particular D/log E characteristics on paper having D/log E characteristics generally similar to said certain D/log E characteristics.

33. A method of photographic printing comprising:
making at least one exposure of a simulation of a properly exposed neutral gray card for a film to be printed having particular D/log E characteristics, and a film-mask-colored element for film having a colored mask, for at least one predetermined period of time on at least one sheet of photographic paper ahving certain D/log E characteristics;
processing each sheet of paper; and
comparing each such exposure of said simulation of a card to a gray reference to determine the color filtration to b used to print all films having D/log E characteristics generally similar to said particular D.log E characteristics on paper having D/log E characteristics generally similar to said certain D/log E characteristics.

34. The method of claim 33 further including:
comparing each such exposure of said simulation of a properly exposed gray card to a gray reference to determine the exposure time; and
measuring the intensity of the exposing light to obtain the proper time and intensity of exposure to be used to print all films having D/log E characteristics on paper having D/log E characteristics generally similar to said certain D/log E characteristics.

* * * * *